Dec. 20, 1949      L. COLANER, SR      2,491,800
AUTOMOBILE FENDER CONSTRUCTION
Filed Aug. 21, 1948      3 Sheets-Sheet 1
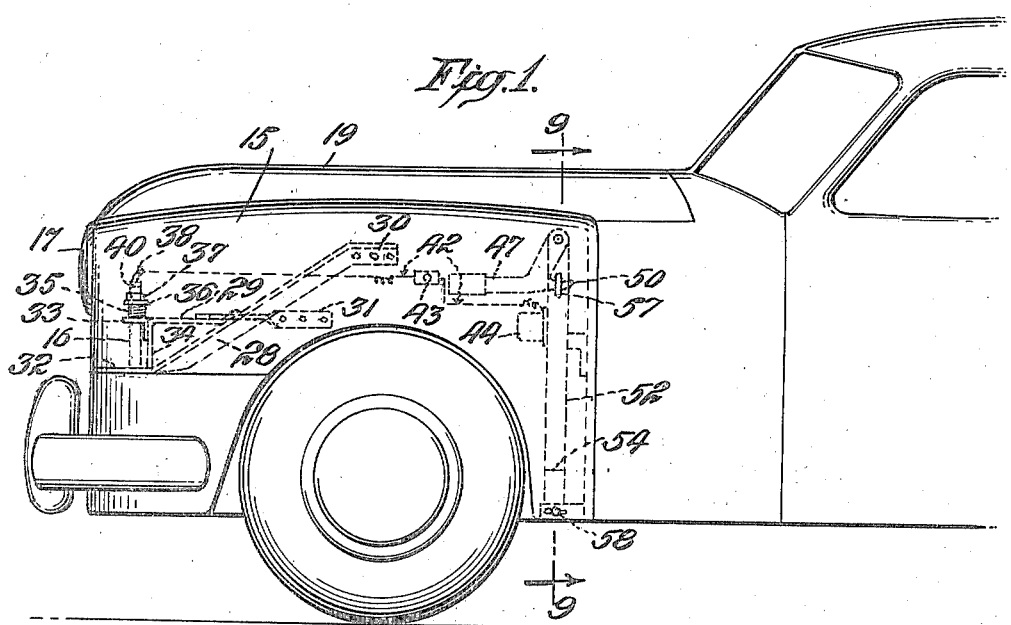
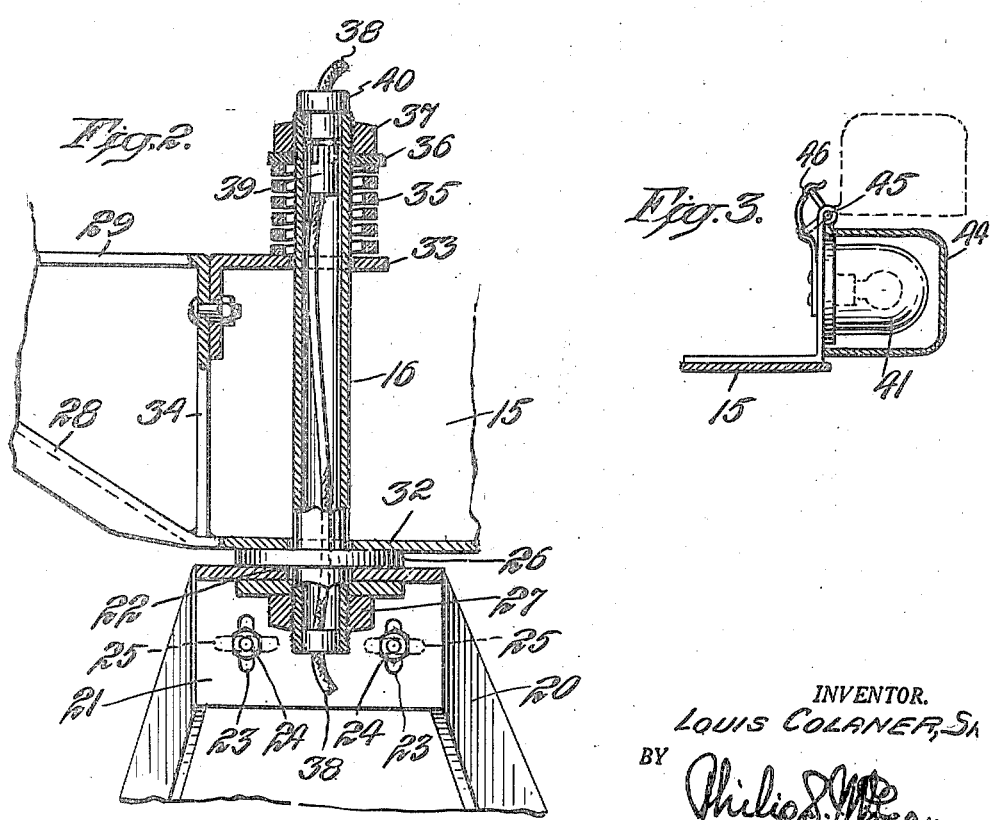
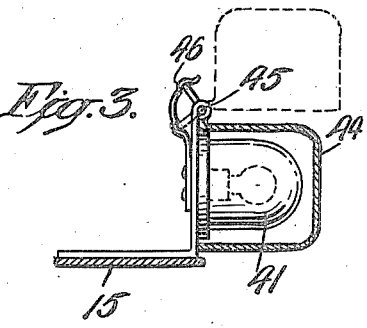
INVENTOR.
LOUIS COLANER, SR.
BY
ATTORNEY Dec. 20, 1949      L. COLANER, SR      2,491,800
AUTOMOBILE FENDER CONSTRUCTION
Filed Aug. 21, 1948      3 Sheets-Sheet 2
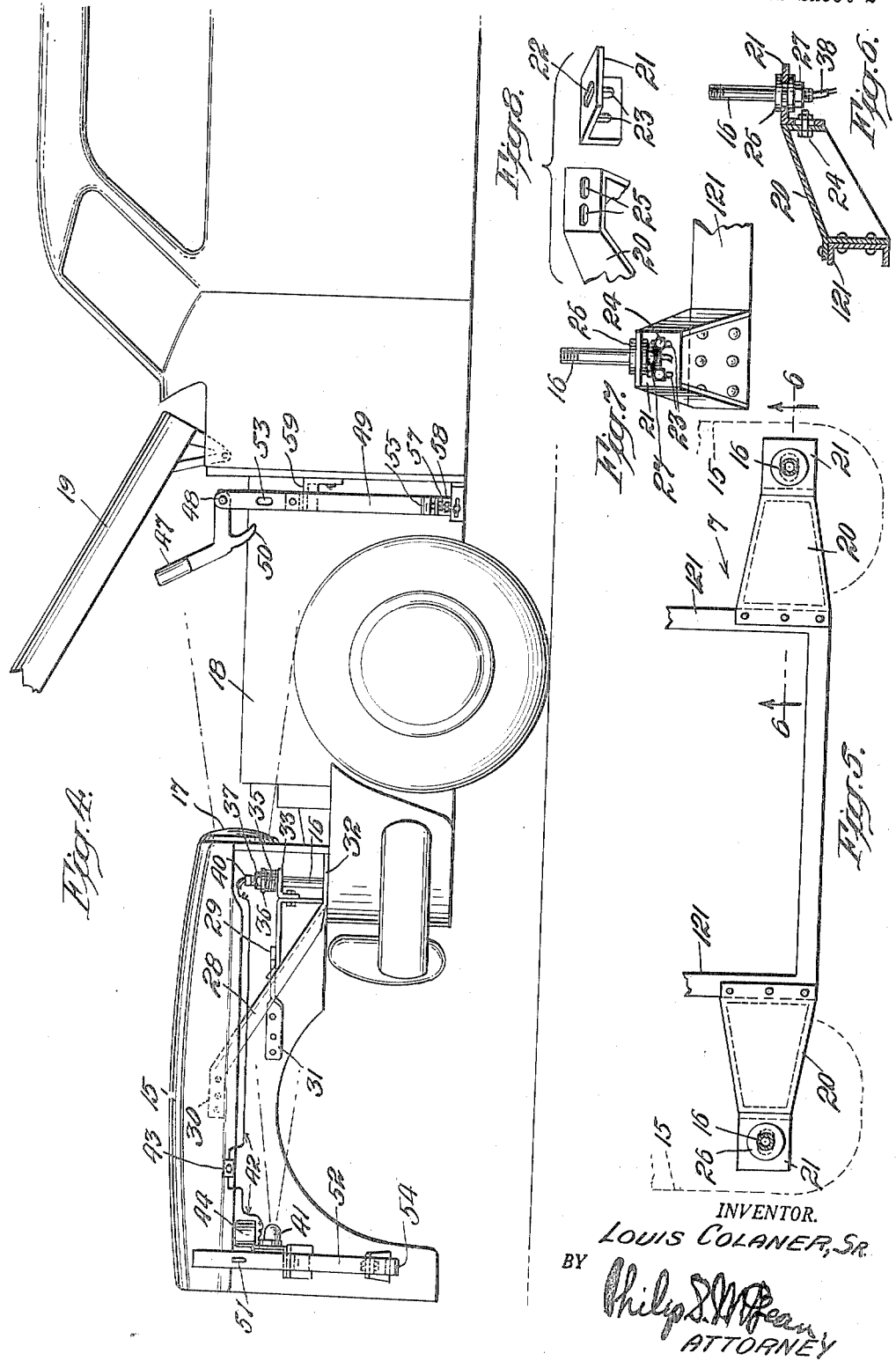
INVENTOR.
LOUIS COLANER, SR.
BY
*Philip S. M'Kean*
ATTORNEY

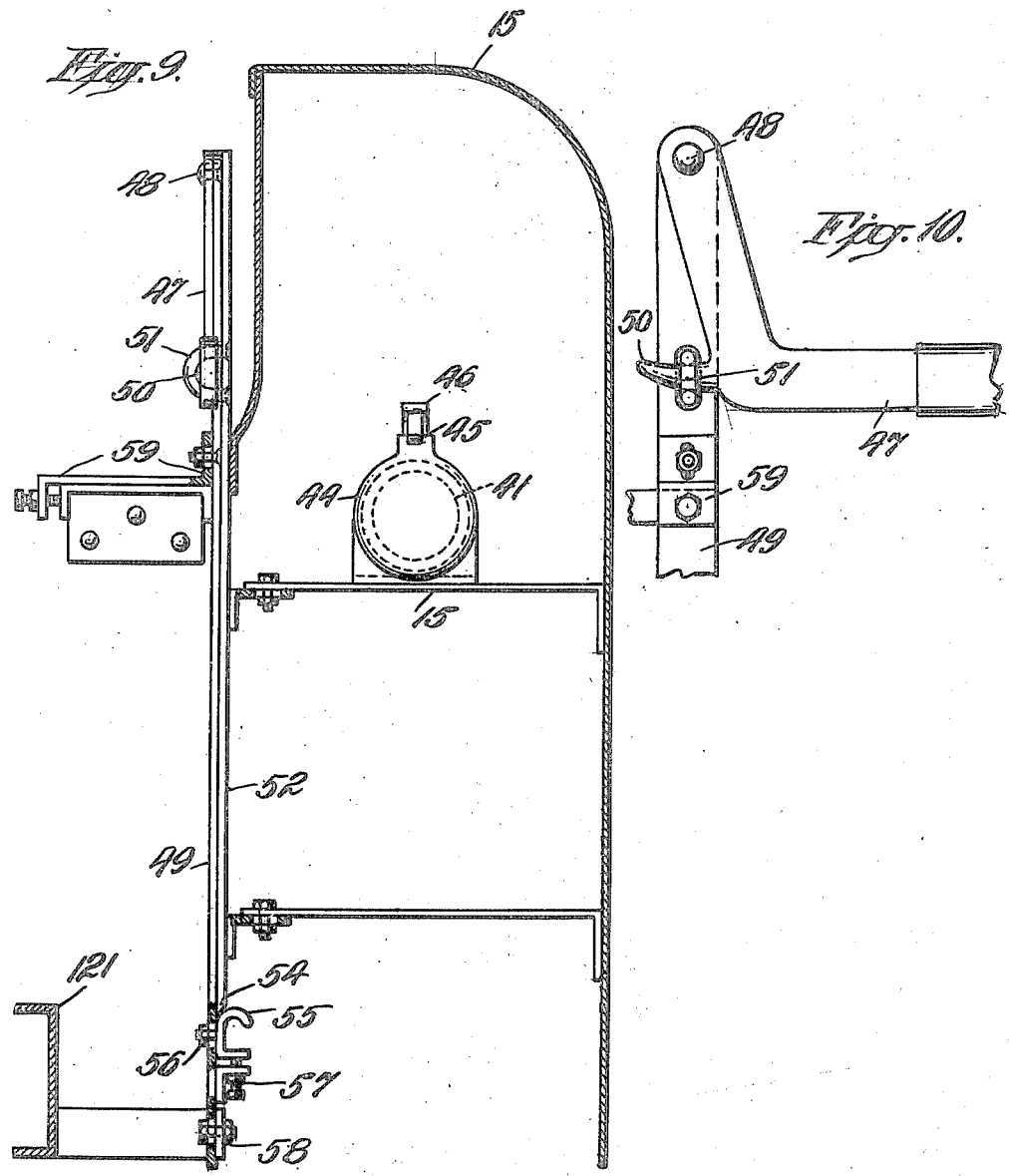

Patented Dec. 20, 1949

2,491,800

UNITED STATES PATENT OFFICE 2,491,800

AUTOMOBILE FENDER CONSTRUCTION

Louis Colaner, Sr., Freehold, N. J.

Application August 21, 1948, Serial No. 45,499

3 Claims. (Cl. 280—152)

The invention here disclosed relates to the construction and mounting of automobile fenders and is a continuation in part of the invention covered in co-pending patent application, Serial No. 736,039, filed March 20, 1947, now Patent No. 2,447,896, dated August 24, 1948.

Particular objects of this invention are to provide a mounting for the fenders which will hold them firmly and positively in place but which when occasion arises, will enable the fenders to be swung open away from the body structure or be entirely removed to expose parts such as brakes, knee actions, wheel bearings and engine parts normally covered or blocked off by the fenders.

Special objects of the invention are to provide fastenings for the fenders, which while readily releasable, will secure the fenders in snug, close-fitting engagement with the body structure and hold them against sagging, rattling or squeaking.

In furtherance of the last stated objects, it is a purpose of the invention to make the mounting connections self-adjusting in character to automatically take up for wear and the like.

Further special objects of the invention are to provide electrical connections for the headlights ordinarily carried by the fenders which will be readily and conveniently separable for the complete removal of the fender from the body and which will be as easily connectable again when the fender is replaced.

Special objects of the invention also are to provide warning or signal means to show when a fender is swung open, projecting into the roadway, and to arrange such signal so as to be energized from the same circuit carrying energy to the headlight mounted in the fender.

Further special objects of the invention are to provide a fender construction of the character indicated, which can be readily applied and adapted to existing body structures and used to advantage in present day methods of manufacture and assembly lines.

Other desirable objects, all attained by the invention, are hereinafter set forth or will appear in the course of the following specification.

The drawings accompanying and forming part of the specification illustrate present preferred embodiments of the invention, but structure and relation of parts may be modified and changed as regards the immediate disclosure, all within the true intent and broad scope of the invention as hereinafter defined and claimed.

Fig. 1 is a broken side elevation of the front end of an automobile with novel features of the fender mounting indicated in broken lines.

Fig. 2 is an enlarged broken sectional detail of the separable swivel mounting for the fender and the detachable electrical coupling for the headlight carried by the fender.

Fig. 3 is a broken and part sectional plan view of the normally hooded signal light housed in the outer swinging end of the fender.

Fig. 4 is a broken side elevation showing the fender swung open, with the headlight directed rearwardly to illuminate the engine compartment or other parts to the rear.

Fig. 5 is a broken plan view of the front end of the frame showing the fender mounting posts in section.

Fig. 6 is a broken sectional detail of one of the fender mounting brackets and the post adjustably carried thereby, parts appearing as on substantially the plane of line 6—6 of Fig. 5.

Fig. 7 is a broken side elevation looking in the direction of the arrow 7, Fig. 5, and showing a fender post and the base bracket by which it is adjustably secured to the outrigger bracket outstanding from the front end of the frame.

Fig. 8 is a composite view illustrating details of the post carrying bracket adjustably secured to the outer end of the frame bracket.

Fig. 9 is an enlarged broken sectional view as on substantially the plane of line 9—9 of Fig. 1.

Fig. 10 is a broken detail view of one of the fender securing locks.

In Figs. 1 and 4 it will be seen that the invention involves the mounting of the front fenders 15 on upright pivot posts 16 at the front end of the frame so that they may be swung around into substantially completely reversed relation to direct the illumination from the headlights 17 into the engine compartment 18 or toward other portions to the rear of the car.

For such purposes the fenders are constructed as units, separate from the hood 19 which, as shown in Fig. 4, is hinged at one end so that it may be raised to open up the engine compartment.

To enable the fenders being swung fully open and preferably to completely or substantially completely reversed relation, the pivot centers are disposed at the front ends and toward the outer sides of the fenders more or less as indicated in Fig. 5.

The outward offsetting of the pivot centers is obtained in the illustration by providing outwardly projecting brackets 20 at opposite sides of the front end of the frame 121. These brackets or outriggers may be upwardly inclined, as indicated in Fig. 6, and the posts may be adjustably affixed to the outer ends of the same as by means of angle plates 21 having enlarged or laterally elongated slots 22 in the top of the same for the posts and vertically elongated slots 23 in the upright portions for bolts 24 extending through horizontally elongated slots 25 in the outer ends of the supporting brackets.

The adjustments thus provided enable the posts to be shifted laterally, vertically, horizontally, and if need be, rocked to some extent in different directions to enable the fenders being set accurately to snugly fit the body of the car and closely cooperate with the hinged hood.

The pivot posts 16 are shown in Fig. 2 as of tubular construction having rigid shoulders or flanges 26 seating on the adjustable mounting brackets 21 and secured in adjustable relation thereon by nuts 27.

The fenders are shown as having bearings pivotally and removably engaged over the posts and provided by upper and lower brackets 28, 29 secured at 30, 31 to the inner walls of the fenders, with the upper brackets 28 extending downward on an incline and terminating in lower bearings 32 and the lower brackets 29 having horizontally extending bearing portions 33 in spaced relation above the lower bearings. These crossed bearing brackets 28, 29 are further shown in Fig. 2 as connected by vertical braces or struts 34 holding the bearing elements 32, 33 rigidly in their proper vertically spaced relation.

The lower fender bearings 32 are shown as seating directly on the shoulder flanges 26 of the posts, which latter then serve as thrust bearings for enabling free swinging movement of the fenders.

To eliminate rattle or vibration and automatically take up any wear, helical springs 35 are interposed between the top bearings 33 and washers 36 held by the nuts 37 on the upper ends of the posts. The removal of such nuts, it will be clear, enables complete removal of the fenders from the posts.

The tubular form of post enables the wiring 38 for the headlights to be carried up through the same and this construction also provides a desirable support for the receptacle element 39 and the detachable plug element 40 of a separable coupling for such wiring.

Thus when a fender is to be completely removed, the electric plug 40 may be withdrawn from the top of the pivot post, uncoupling the circuit wires and leaving the fender free to be lifted off the post, completely separated from the car.

In this separated state, if the fender is held or placed near enough the car, the plug 40 may be recoupled to the socket in the top of the post to enable use of the fender headlight for any required illumination purposes.

The wiring described, including the separable plug connection, are of suitable waterproof construction to avoid possibility of any leaks or short circuits.

When the fender is swung outward away from the car, particularly the left fender, it is desirable to provide a warning light which will show that the fender is overstanding or projecting toward the roadway.

Accordingly, the left, or, if desired, both fenders may be equipped with signal lamps such as shown at 41, mounted at the outward swinging end of the fender, connected by wiring 42 with the headlight wiring and containing a switch 43 by which this signal light can be thrown on at a time when the fender is swung out over the roadway.

As this signal light is only used at special times, it may be normally hooded over by a cover 44, Fig. 3, hinged at 45 and held in either the closed or open positions by spring detent mechanism 46.

The rearward, free swinging ends of the fenders are rigidly held to the car body by quick releasible latch mechanism shown particularly in Figs. 4, 9 and 10 as comprising hand levers 47 on uprights 49 carried by the frame pivoted at 48 and provided with wedge pins 50 to pass through the hasps 51 projecting inwardly from uprights 52 at the inner sides of the fenders. The uprights 49, as shown in Fig. 4, have guide slots 53 through which the rounded ends of the hasps 51 will project as the fenders swing closed against the sides of the car and the wedges 50 are designed to pull the fenders closely inward with the uprights 52 on the fenders in abutting engagement with the uprights 49 on the frame.

The hasp fastenings securely hold the upper rearward portions of the fenders and the lower rearward portions are also braced and firmly held in the structure illustrated by providing the lower ends of the fender uprights 52 with beveled wedge points 54 to ride up over and in behind the inclined keepers 55 at the lower end portions of the fixed uprights 49. These keepers are shown in Fig. 9 as secured in vertically adjustable relation at 56 and as having vertically adjusting means at 57 by which the parts can be related to firmly support and positively hold the fenders in place and to take up for any wear that may occur.

The fixed uprights 49 are indicated in Figs. 4 and 9 as secured in vertically adjustable relation to the frame at 58 and as secured at the top to the cross wall or partition of the car body in adjustable relation at 59.

Thus, any necessary adjustments may be made at the rearward securing end of the fenders for fastening and holding them firmly and snugly in place at the sides of the car body and any wear that may occur may be quickly and easily taken up by appropriate adjustment of the interfitting or co-fitting parts.

In addition to the many advantages attained by having the fenders so that they may be swung open away from the sides of the car or be completely removed, the invention provides special advantages in the original manufacturing and assembly of the cars, enabling the fenders to be handled separately from the body and to be put on at the most advantageous stage of manufacture or final testing.

What is claimed is:

1. In an automobile having a frame structure, an engine hood, wheel fenders at the sides of the hood, forwardly directed headlights on the fenders, said fenders being separate from the hood and said hood being hinged at one end enabling it to be raised independently of the fenders, upstanding pivot studs on the front end of the frame at opposite sides of the same, bearings on the fenders pivotally engaged on said pivot studs, quick releasable means for securing the rearward ends of the fenders in normal position at the sides of the hood, a road signal light mounted on the rearward end of the left front fender and exposed to the roadway when the fender is swung open away from the side of the car, electrical connections to the headlight carried by said fender and to said roadway signal light and switch means in said electrical connections by which said signal light may be thrown on only when said fender is swung outward into the roadway.

2. In an automobile having a frame structure, an engine hood, wheel fenders at the sides of the hood, forwardly directed headlights on the fenders, said fenders being separate from the hood and said hood being hinged at one end enabling it to be raised independently of the fenders, upstanding pivot studs on the front end of the frame at opposite sides of the same, bearings on the fenders pivotally engaged on said pivot studs, quick releasable means for securing the rearward ends of the fenders in normal position at the sides of the hood, a road signal light mounted on the rearward end of the left front fender and exposed to the roadway when the fender is swung open away from the side of the car, electrical connections to the headlight carried by said fender and to said roadway signal light, switch means in said electrical connections by which said signal light may be thrown on only when said fender is swung outward into the roadway and a hood over said signal light protecting the same from under-fender grime and water and movable to uncover said light when the same is to be used as a roadway signal.

3. In an automobile having a frame structure, an engine hood, wheel fenders at the sides of the hood, forwardly directed headlights on the fenders, said fenders being separate from the hood and said hood being hinged at one end enabling it to be raised independently of the fenders, upstanding pivot studs on the front end of the frame at opposite sides of the same, bearings on the fenders pivotally engaged on said pivot studs, quick releasable means for securing the rearward ends of the fenders in normal position at the sides of the hood, said pivot studs being of tubular structure and electrical connections to said headlights extending up through said tubular studs and including separable connector plugs seated in the top of said tubular studs.

LOUIS COLANER, Sr.

REFERENCES CITED

The following references are of record in the file of this patent:

UNITED STATES PATENTS

| Number | Name | Date |
|---|---|---|
| 2,413,792 | Sharp | Jan. 7, 1947 |
| 2,447,898 | Colaner, Sr. | Aug. 24, 1948 |